Sept. 9, 1941.  W. E. WOODARD  2,255,303

LOCOMOTIVE ENGINE

Filed Jan. 21, 1938  6 Sheets-Sheet 2

INVENTOR
William E. Woodard
BY
Symnestvedt & Lechner
ATTORNEYS

Sept. 9, 1941.  W. E. WOODARD  2,255,303
LOCOMOTIVE ENGINE
Filed Jan. 21, 1938  6 Sheets-Sheet 4

INVENTOR
William E. Woodard
BY
Synnestvedt & Lechner
ATTORNEYS

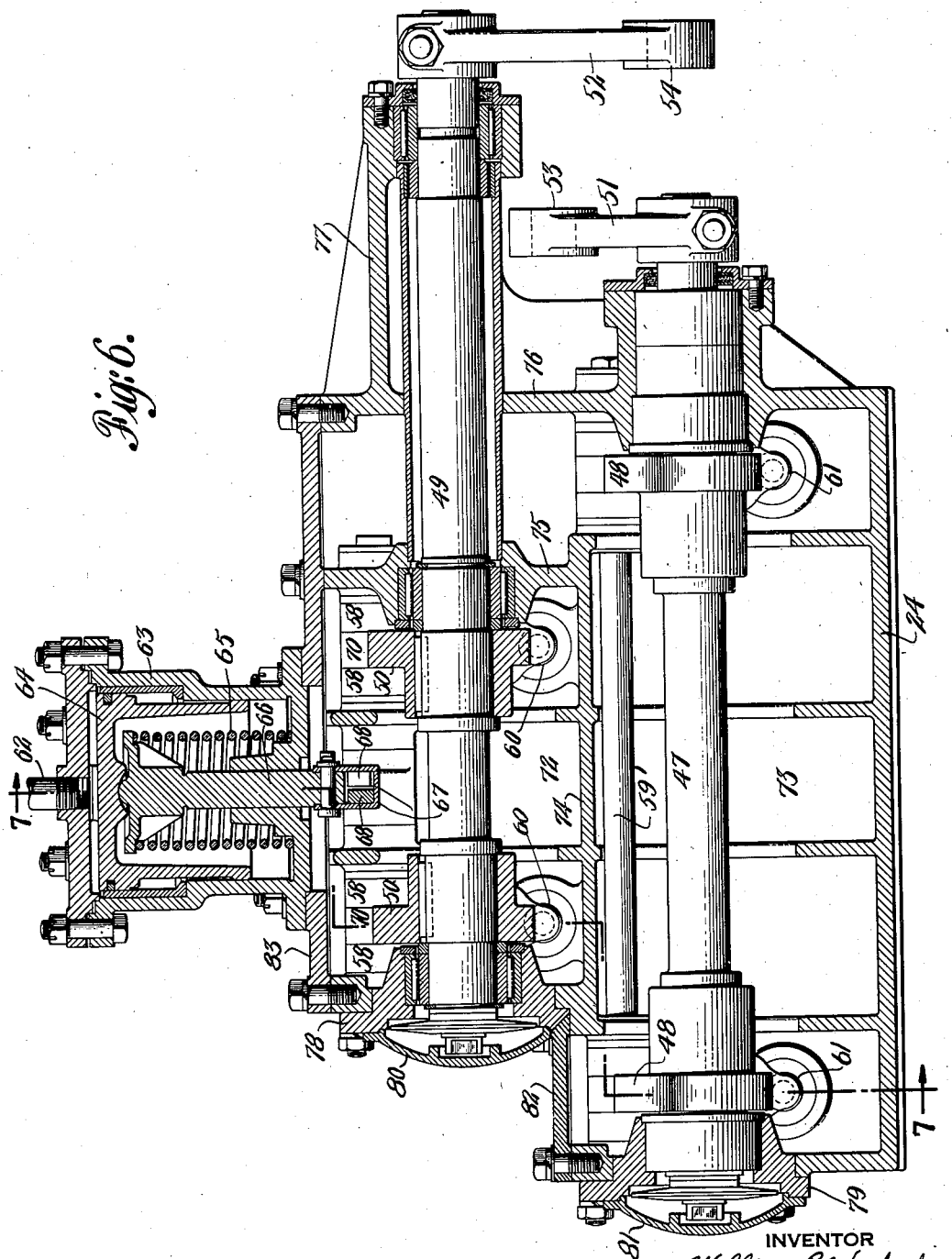

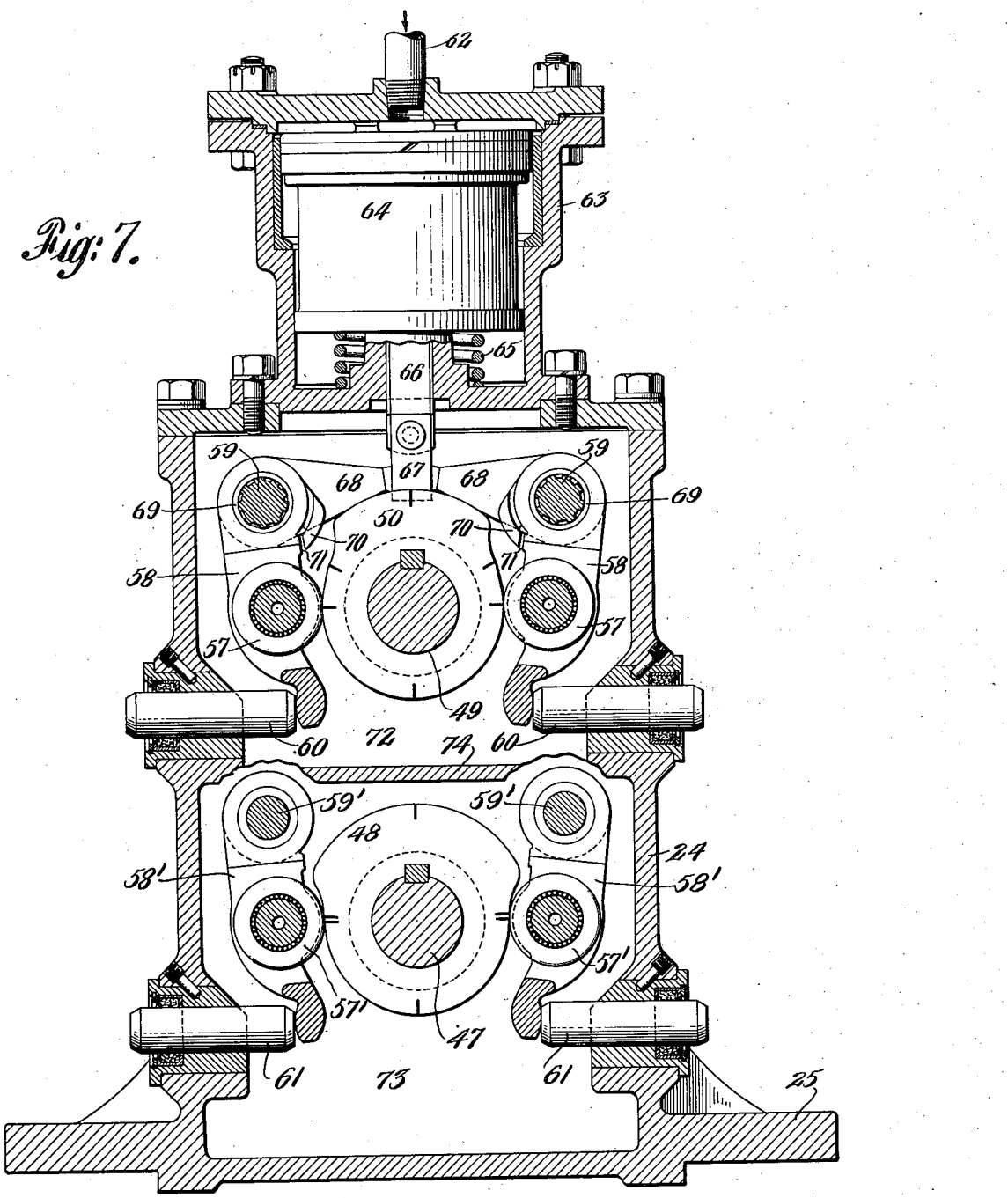

Patented Sept. 9, 1941

2,255,303

UNITED STATES PATENT OFFICE 2,255,303

LOCOMOTIVE ENGINE

William E. Woodard, Forest Hills, N. Y.

Application January 21, 1938, Serial No. 186,139

30 Claims. (Cl. 105—44)

This invention relates to locomotive engines and the like, and especially to the steam distributing mechanism associated with the cylinders, particularly the arrangement of the steam chests, valves, valve actuating mechanism and associated conduits and cylinder saddle structure. While not limited in its broad aspects to engines having poppet valves, the invention is especially advantageous in that field and the embodiment herein illustrated is therefore of that type.

One of the primary objects of the invention is to materially increase the efficiency of the engine, particularly by a substantial reduction in the cylinder clearance.

Another important object of the invention is to reduce the size and weight of parts, especially of the valves and valve actuating members, and particularly in a poppet valve construction to improve the seating of the valves and reduce the warping and distortion thereof and of the associated parts, especially by a novel construction and disposition of multiple exhaust and/or admission valves.

The invention further contemplates improvements in the arrangement of the valve chests, the valve actuating means such as cam mechanism, and the steam admission and exhaust cavities and conduits, relative to each other and to the associated cylinder and saddle structure.

More specifically, the invention involves the arrangement of multiple-valve steam chests at each end of each cylinder, preferably in superimposed relation to the cylinders, with a plurality of exhaust poppet valves in each chest spaced apart peripherally of the cylinder and positioned relatively close to the cylinder wall, and one or more admission poppet valves located between the exhaust valves and/or spaced somewhat farther from the cylinder wall; the arrangement preferably being such that the two exhaust valves in the steam chest reciprocate on parallel axes lying in a horizontal plane relatively close to the cylinder wall and the two admission valves have their reciprocating axes lying closer together and in a parallel horizontal plane positioned above the plane first mentioned; the arrangement of the steam delivery piping for each cylinder in the form of a downwardly extending conduit which branches toward each end of the cylinder and delivers to the admission valves at the outer end of each chest; the arrangement of the exhaust piping for each cylinder in the form of a pair of branched conduits which connect centrally of the cylinder saddle to the exhaust nozzle, each conduit leading respectively to the chest at one end of the cylinder and having upper and lower branches which are superimposed in spaced relation, the lower branch taking exhaust steam from the steam cavity adjacent the exhaust valve which is disposed toward the inner side of the cylinder, and the upper branch taking exhaust steam from the steam cavity adjacent the exhaust valve which is disposed toward the outer side of the cylinder; the disposition of a cam box (for actuation of the valves) upon a seat located centrally on top of the cylinder, said box being adapted to be slipped into place from the side of the locomotive and having superimposed cam shafts extending transversely of the engine, the upper shaft carrying two admission cams, one associated with one admission valve for each end of the cylinder and the other associated with the other admission valve for each end of the cylinder, the lower shaft carrying a pair of exhaust cams similarly associated with the exhaust valves; the actuation of the valves being effected by suitable cam followers and/or levers which operate reciprocable tappets extending through the front and rear walls of the cam box; and the disposition of the cam shaft operating linkage substantially horizontally, to extend forwardly from the valve gear proper, through the space provided between the upper and lower branches of the exhaust conduit means, and thence coupled centrally between the two branched exhaust conduits to the actuating levers of the cam shafts.

Still further, the invention contemplates the unitary casting of the steam chests, the exhaust conduit means and at least part of the steam conduit means, in substantially the relation above described, preferably as an integral part of the cylinder and saddle structure, which is further provided with an integrally cast pad or support for the carrying and attachment of the separately formed cam box.

How the foregoing objects and advantages are secured, together with such others as are incident to the invention, will appear from the following description, taken together with the accompanying drawings, wherein:

Figure 6 is a vertical section, taken transversely of the locomotive, through the cam box mechanism only, substantially on the line 6—6 of Figure 2, but to a larger scale; and Figure 7 is a further enlarged staggered vertical sectional view taken through the cam box substantially as indicated by the line 7—7 on Figure 6.

Figure 1:
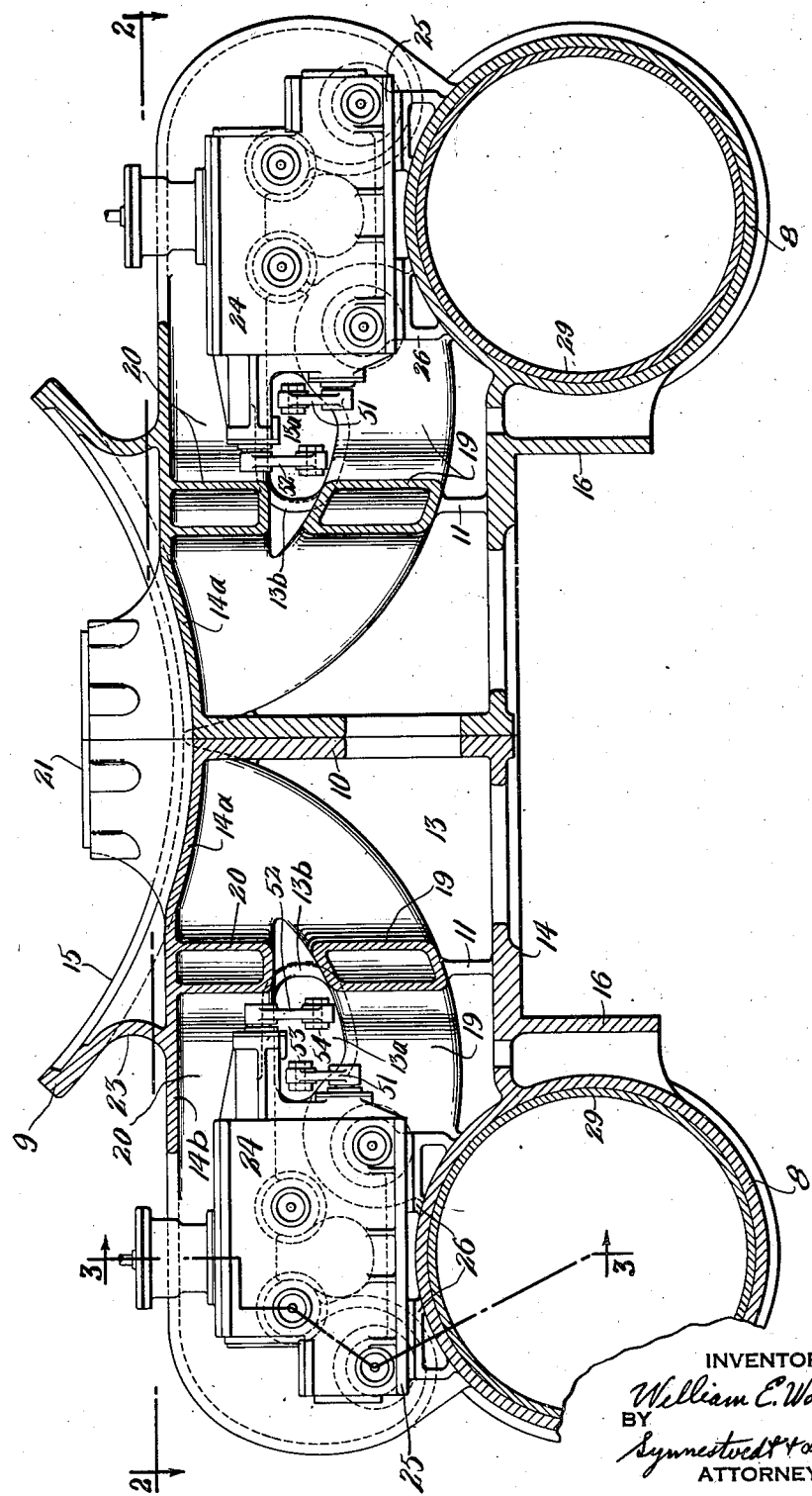
Figure 1 is a vertical transverse section through a cylinder and saddle casting structure, with associated cam boxes shown in elevation, illustrating the present preferred embodiment of the invention, the view being taken substantially on the line 1—1 of Figure 2.
Figure 2:
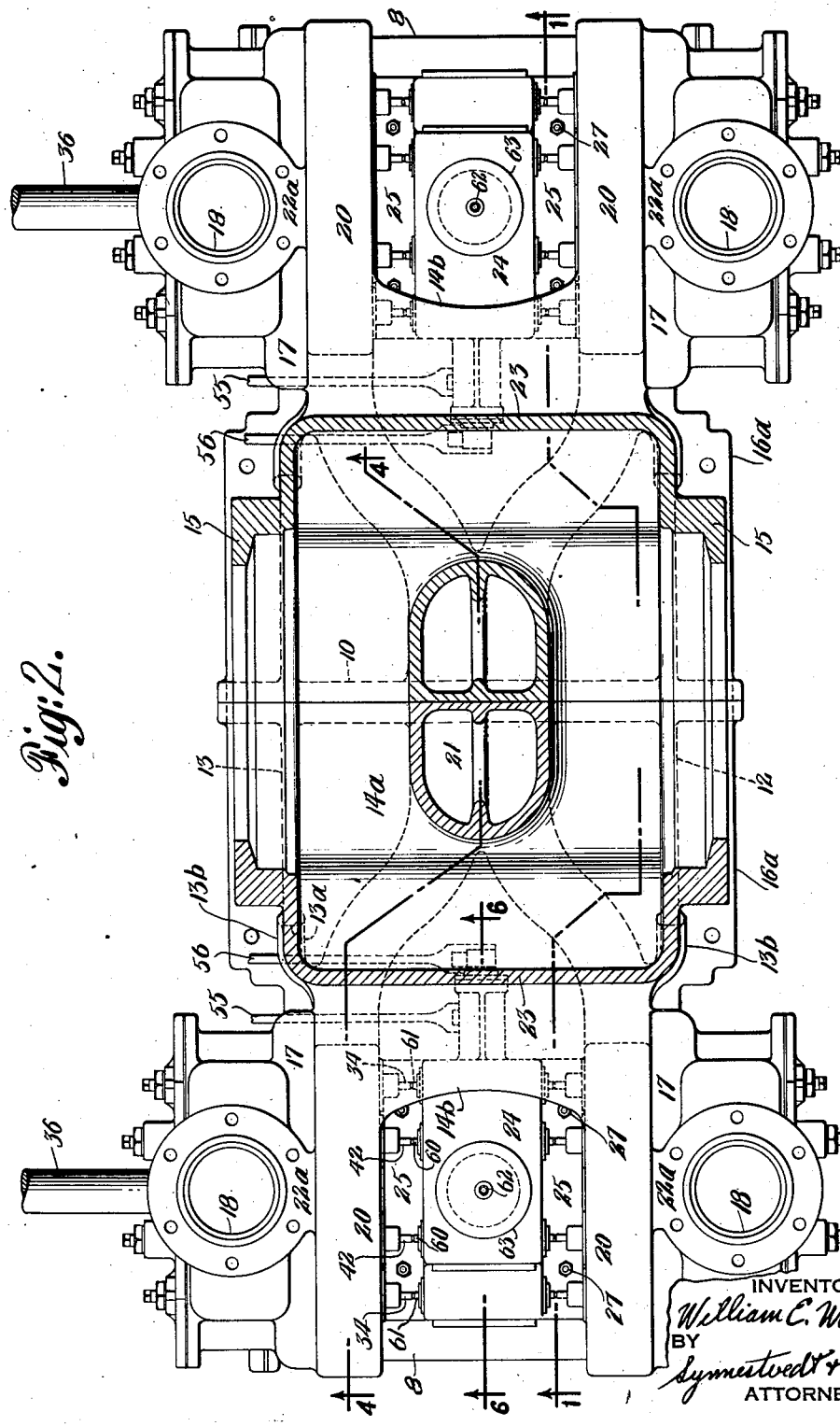
Figure 2 is a plan section, taken approximately on the line 2—2 of Figure 1.
Figure 4:
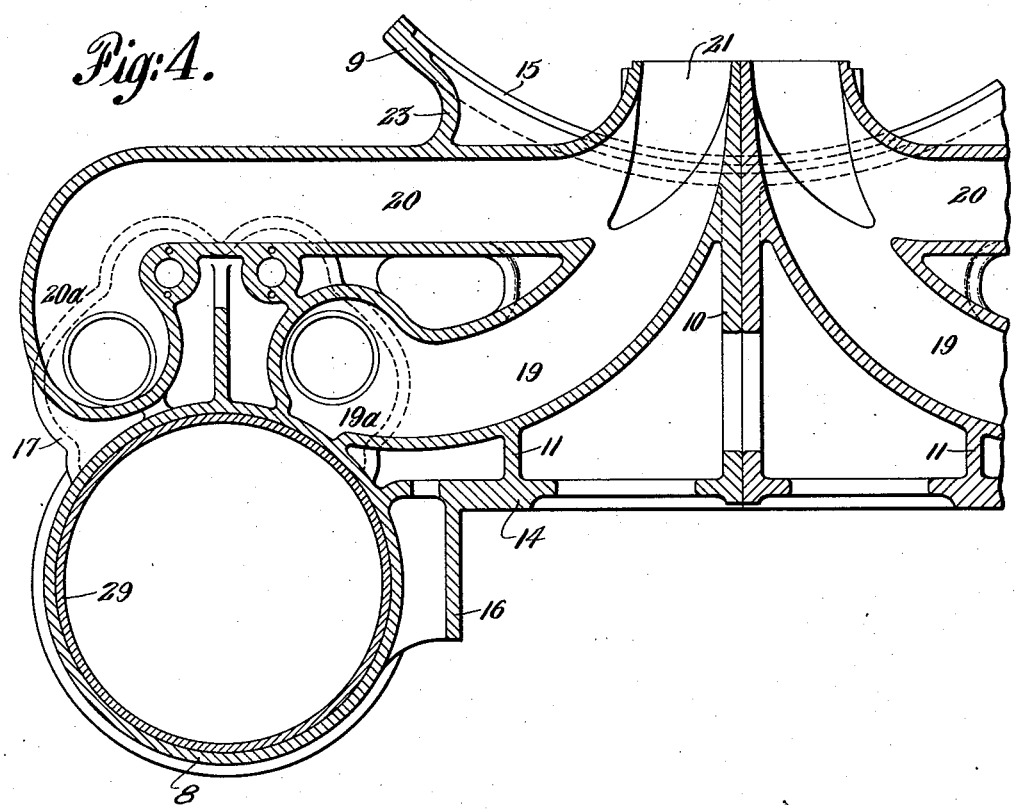
Figure 4 is a somewhat irregular, transverse vertical section, similar to Figure 1, but taken through the exhaust cavities and passages adjacent the rear end of the right-hand cylinder, about as indicated by the line 4—4 in Figure 2.

Referring first to Figures 1, 2 and 4, it will be seen that I have illustrated a locomotive engine structure (in the sense of the power unit of the locomotive), comprising cylinders, valve chests, saddle, exhaust conduits, etc., the major portion of which may be cast either as a single unit, or in right and left halves as here shown. A description of the right hand half of this structure will be sufficient for a full understanding of the invention.

The cylinder 8, having removable head or cover 8c, is cast integrally with the saddle structure 9 which incorporates main longitudinal vertical webs 10 and supplemental bracing webs 11, main transverse webs 12, 13, bottom wall 14, top wall 14a which curves downwardly toward the middle of the saddle, upper flanging 15 for mounting the boiler (not shown), lower vertical flanging 16 for fastening the casting to the longitudinal members of the main frame (not shown), bottom transverse flanges 16a for fastening to transverse members of the main frame, and other bracing webs, flanges, fillets, etc.

Figure 3:
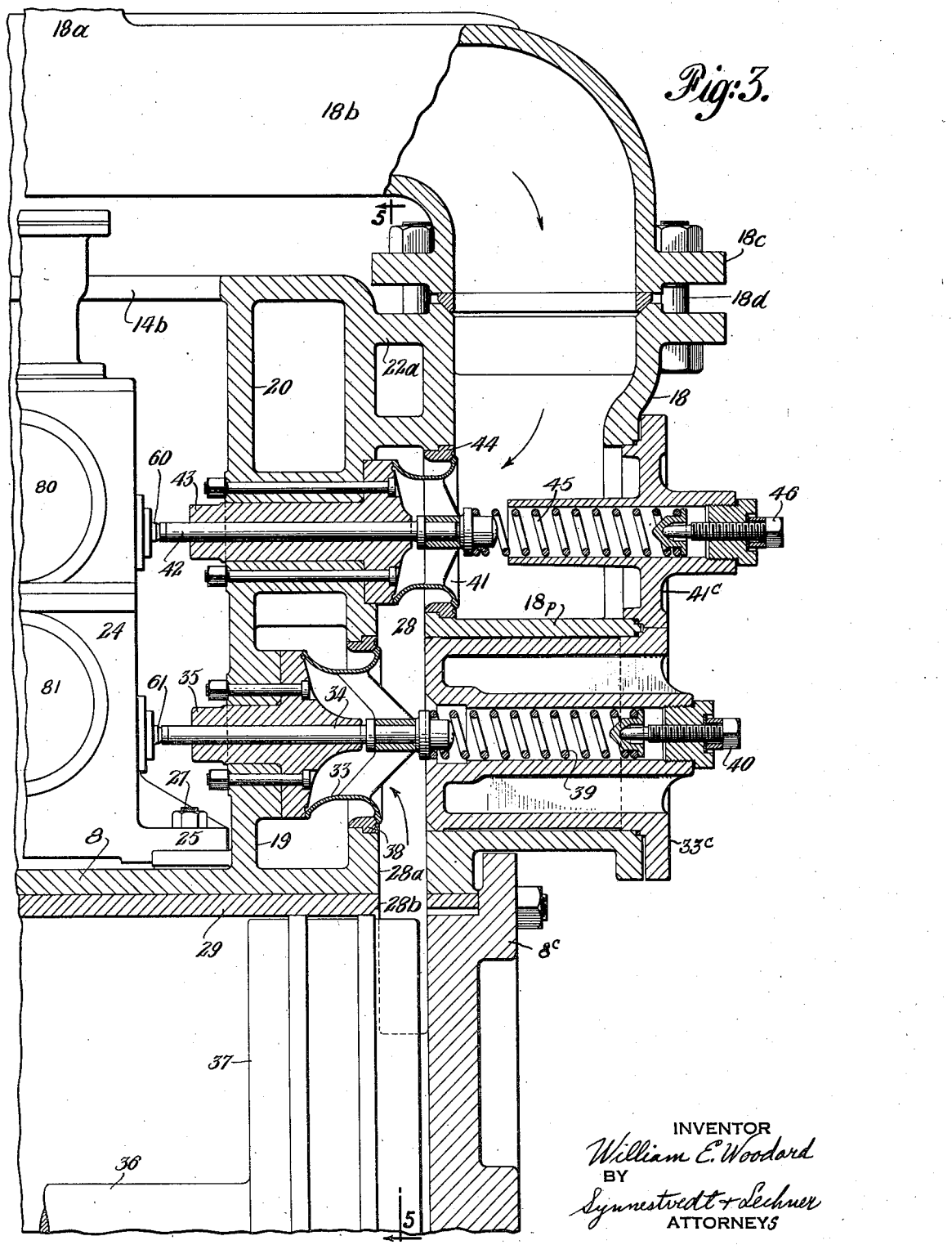
Figure 3 is an irregular vertical longitudinal section, to a larger scale, through one of the steam and one of the exhaust valves and associated parts at the front end of the right-hand cylinder of the locomotive, the section being taken substantially on the line 3—3 of Figure 1.
Figure 5:
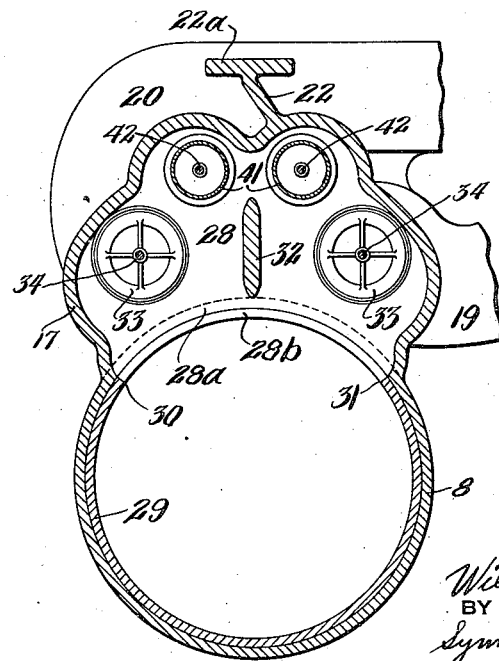
Figure 5 is a vertical transverse section taken about on the line 5—5 of Figure 3, but being to the same scale as Figure 4.

Integral with the foregoing structure, there is cast at each end of the cylinder a valve chest 17 (the internal form of which is best seen in Figures 3 and 5), steam admission conduit means 18 (see Figures 2 and 3), and steam exhaust conduit means each comprising a lower branch 19 and an upper branch 20, the two branches merging together and the two conduits also merging, centrally of the saddle to form a common exhaust steam outlet 21 for connection to the exhaust nozzle (not shown). An upright connecting web 22 and another web 22a, enlarged to form a pipe flange, (as seen in Figures 2, 3 and 5) are positioned between each admission conduit 18 and upper exhaust branch 20. The live steam pipe 18a, coming down centrally over the cylinder, divides into branches 18b, the forward branch being shown in Figure 3 as connected by flange 18c and bolts or studs 18d to flange 22a; the steam passage extending downwardly to the partition wall 8p. A stiffening web 23 merges with the upper wall 14a of the saddle casting (as seen in Figures 1 and 3), said wall extending outwardly at 14b between the upper exhaust branch 20 at one end of the cylinder and the upper exhaust branch 20 at the opposite end of the cylinder.

As seen in Figures 1 and 2, the cam box 24 fits between the two steam chests, and is slipped into place on top of the cylinder and beneath the bracing web 14b. This box has a flanged base 25 resting upon the pads or supports 26 formed integrally with the the cylinder casting and is secured thereto in any convenient manner, as by the bolts or studs 27. The internal mechanism of the cam box, and its operating connections, will be described hereinafter, following the detailed description of the valves and valve chests.

Turning now to Figures 3, 4 and 5, it will be seen that each valve chest has a cavity or port 28, which may be considered an extension of the steam portage 28a communicating with the cylinder, the cylinder bushing 29 having a registering peripheral slot 28b, so that there is open communication from the cavity 28 into the cylinder, throughout an arc extending from the point 30 to the point 31 (Figure 5). To brace the front and rear walls of the chamber or port 28, an integral web 32 is provided, which as seen in Figure 5 may in cross section be of a substantially streamlined form so as to offer the least resistance to the flow of steam.

The exhaust valves 33 are of the double seating annular poppet type, each being mounted by a stem 34 in a sleeve or bushing 35, for reciprocation on an axis paralleling the axis of the piston rod 36 which is coupled to the piston 37 in the cylinder 8. Each exhaust valve has an edge seating upon a flange of the bushing 35 and another edge seating upon the seat 38 in the inner wall of the cavity 28, the valve being designed for a slight over-balance toward closing position under the influence of the steam pressure, and being further urged toward closing position by the spring 39 which has a pressure adjusting device 40 mounted in the closure means 33c (as seen in Figure 3). The two exhaust valves deliver the exhaust steam respectively into the extreme end portions 19a and 20a of the branches 19 and 20 of the exhaust conduit (as seen in Figure 4).

Spaced above the common horizontal plane containing the exhaust valve axes, and located intermediate the parallel vertical planes of said axes, is a pair of admission valves 41, each of which is mounted by a stem 42 for axial reciprocation in a sleeve or bushing 43, the valve having one edge seating on a flange of said bushing and a second edge seating on the seat 44 in the front wall of the cavity 28; springs 45 and adjusting devices 46 being applied also to these valves, and mounted in the closure means 41c. From Figure 3 it is clear that the closures for the access openings to the valves, and the valves which are axially aligned therewith, are as close together as permitted by their peripheries and by the thin partition wall 18p, and are further positioned with the periphery of the closure 33c as close to the cylinder axis as the removable cylinder head 8c will permit; and further that the closely-spaced parallel walls of the port 28 define a direct flow path for the steam, the exhaust valve means 33 being largely outside of said path when seated, and the admission valve means 41 being positioned to lie largely within said port when seated.

By the above described arrangement of the valves, the maximum required flow area for the steam admission and exhaust is secured with a substantial reduction in the effective volume of the cavity or port 28 and thus in the cylinder clearance. This can readily be seen if, for the moment, the reverse arrangement be considered, i. e., if the admission valves were lying intermediate the exhaust valves and the cylinder. With the latter arrangement the entire internal volume defined by the peripheral wall of the admission valve, when said valve is seated, would be subtracted from what should be part of the effective flow area of the cavity, so that the exhaust steam in passing up through the cavity would have to go around the outer periphery of the admission valve to reach the exhaust valve, and it would be necessary to substantially enlarge the flow passage around the periphery of the admission valve in order to provide sufficient flow area for the exhaust steam. Heretofore it has not been feasible to bring down the cylinder clearance to less than about 10% of the cylinder volume, but by my improved arrangement (best shown in Figures 3 and 5) the cylinder clearance can be brought down to about 7% without any reduction in effective flow area for the admission or exhaust of steam, which is important in avoiding any drop in intake pressure or increase in exhaust pressure, either of which would cut down the engine power and the economy of operation.

By arranging the valves in multiple, the diameter and weight of the individual valves can be greatly reduced and at the same time proper seating and effective operation of the valves, and their tightness under steam, greatly improved. Additionally, by locating the exhaust valve axes in one horizontal plane and the admission valve axes in a superimposed horizontal plane, and bringing all the valve stems in each chest out through the chest wall facing the middle of the cylinder, the cam box can be formed very compactly, with superimposed cam shafts. The mechanism of the cam box will now be described.

Turning now to Figures 6 and 7, it will be seen that the cam box 24 contains an exhaust cam shaft 47 carrying a pair of exhaust cams 48, and superimposed thereabove is an admission cam shaft 49 carrying a pair of admission cams 50. These two shafts are rocked or oscillated respectively by the levers 51 and 52 to which are pivotally coupled respectively at 53 and 54 the longitudinally extending actuating links 55 and 56 which pass rearwardly to points behind the cylinder saddle for connection with the valve gear proper. The valve gear is not shown in this case, since the type of valve gear has no bearing upon the present invention, but the two cam shafts with their driving links 55, 56, are shown as being arranged for operation by a centralized valve motion mechanism such as disclosed and claimed in my copending application Serial No. 121,398, filed January 21, 1937, issued November 29, 1938 as Patent No. 2,138,053.

As seen in Figures 1 and 2, the rear vertical transverse wall 13 of the saddle casting, approximately where it curves to merge with the exhaust conduits, is apertured at 13a, to accommodate the cam shaft actuating connections, which also pass between the upper and lower branches 19 and 20 of the rear exhaust conduit, there being suitable reinforcing beading 13b around said aperture 13a.

Turning again to the cam box, it will be observed from Figure 7 that there are a pair of opposed cam followers or rollers 57 cooperating with each admission cam 50, these rollers being respectively mounted on oscillating levers 58 which are bifurcated to receive the rollers and are pivoted respectively on shafts 59 by means of floating bushings 69, the lower ends of said levers contacting with valve tappets 60, each aligned with one of the admission valve stems 42. Similar cam followers 57' and levers 58' mounted on shafts 59' cooperate with the exhaust cams 48 and actuate the exhaust valve stems 34 through the intermediation of tappets 61.

For purposes of drifting, when the locomotive throttle is closed, all four admission valves of each cylinder may be opened, and held open, by the delivery of compressed air through pipe 62 into the top of the cylinder 63 which is mounted on the upper face of the cam box 24, the operation of this mechanism being as follows:

Upon admission of compressed air or other fluid under pressure through the pipe 62, the piston 64 is forced downwardly against the pressure of spring 65. Piston stem 66 carries a yoke 67 embracing the adjacent ends of two oppositely extending levers 68, 68. Each of said levers is splined upon one of the splined shafts 59, and each shaft carries a pair of arms 70, one for each valve operating lever 58. Normally, when the piston 64 is held in raised position by means of the spring 65, there is a clearance between the arms 70 and the abutments 71 on the levers 58, but when the piston is depressed, the arms 70 engage the abutments 71 and swing the levers 58 outwardly until their rollers 57 are out of contact with the cam 50, the admission valves being then held wide open, during drifting operation of the locomotive. This drifting device is not per se, my invention, but my multiple valve and cam box arrangement has been adapted to receive the device in a manner to operate on all the admission valves of each cylinder. The operating arrangement for the drifting device is disclosed and claimed in my Patent No. 2,234,613, issued March 11, 1941.

Lubrication of the cam box parts may be secured by maintaining oil in the two chambers 72 and 73, to such a level that the cams will dip thereinto and effect a splash lubrication of the various parts including the roller bearings shown. The chambers 72 and 73 are in part defined by the horizontal partition wall 74, which also serves to interbrace the front and rear walls of the box, and by the vertical partition 75, which latter serves also as the intermediate bearing support for the admission cam shaft 49. The inner bearing support for the exhaust cam shaft 47 is provided by the external wall 76 of the box, from which there overhangs an extension 77 providing a bearing support for the inner end bearing of the shaft 49.

At the outer side of the box, bearing supports 78, 79, and cover plates 80, 81, which are removably secured by studs as shown, are provided, not only for the purposes of supporting such shafts but also as a means of inserting and removing the cam shafts, cams, bearings and associated parts. Removable cover plates 82 and 83 are also provided, for purposes of assembly, inspection, repair and the like; the cover plate 82 having its inner edge beveled to fit a cooperating edge of the bearing support member 78. Various other bracing and supporting members are provided integrally inside the box, as shown.

By extending the admission cam shaft 49 farther inwardly than the exhaust cam shaft 47, and disposing the levers 52 and 51 in downwardly and upwardly extending side-by-side relation, the coupling thereto of the actuating linkages from the valve gear proper is simplified and made very compact. By disconnecting the levers 51 and 52 from the shafts 47 and 49, and by removing the bearing supports and cover plates 78, 79, 80 and 81, the cam shafts, cams, etc. can be readily pulled laterally out of the cam box.

From the above description of the cam box and its internal mechanism, it will be evident that by the superimposed arrangement of the transversely extending admission and exhaust cam shafts, the side-by-side arrangement of the admission cams and of the exhaust cams respectively, each cam and its valve actuating mechanism being in alignment with the vertical plane containing the axes of one of the valves at each end of the cylinder, and by the corresponding arrangement of the exhaust and admission valves in superimposed planes, there results an extremely compact structure, which is readily accessible for inspection, repair and removal of parts, and which is further relatively simple, even though multiple admission and exhaust valves are employed for each end of each cylinder.

From the detailed description of the mechanism as a whole, it should further now be evident how the various objects and advantages mentioned at the beginning of this specification are secured, and particularly that the use in each chest of multiple admission poppet valves acting in parallel (i. e. timed substantially in unison by a common cam shaft), and likewise multiple exhaust valves, results in ample steam flow area, though the individual valves are of relatively small size and light weight; that the placing of the exhaust valves close to the cylinder and the provision of separate exhaust passages for each exhaust valve permits the highly advantageous relative arrangement of the admission and exhaust valves, resulting in a reduction in cylinder clearance volume, and also permits the shortest possible connections from the cam shafts back to the valve gear proper; that a single cam box can be disposed centrally of the cylinder for actuation of all eight valves thereof; and that the exhaust conduits cooperate in strengthening the integral cylinder and saddle casting. It may also be observed that by the use of the present invention in conjunction with the compact valve gear unit disclosed in my aforementioned copending application 121,398, which is driven solely from the two crossheads of the locomotive, it is possible to effect a saving of from 100 to 200 horsepower in the operation of the valve mechanism considered as an entirety, as compared with types of valves and valve gear at present in ordinary use.

I claim:

1. In a locomotive engine or the like, a cylinder with valve chests one at each end thereof, in each chest a fluid passage communicating with the cylinder, a pair of exhaust valves in each chest communicating with said passage and having their axes in spaced parallelism and lying relatively close to the cylinder wall, in each of said chests and admission valve means in said passage located in spaced relation to a plane common to both exhaust valve axes.

2. In a locomotive engine or the like, a cylinder with associated valve chests, one at each end, a plurality of reciprocating admission valves in each chest, a plurality of reciprocating exhaust valves in each chest, and cam mechanism positioned intermediate said chests including admission cam means and exhaust cam means operatively associated respectively with the admission valves and the exhaust valves at both ends of the cylinder, the exhaust valves being closer to the cylinder than are the admission valves, and the cam mechanism for all valves being supported as a unit for unitary removal from between the chests.

3. In a locomotive engine or the like, a cylinder having a valve chest associated therewith at each end thereof, in each chest a plurality of reciprocating admission valves having their axes in one plane, in each chest a plurality of reciprocating exhaust valves having their axes in another plane, and cam mechanism positioned intermediate said chests including admission cam means and exhaust cam means operatively associated respectively with the valves in said two planes, and the cam mechanism for all said valves being supported in common, for unitary insertion and removal from between said chests.

4. In a locomotive engine or the like, a cylinder having a valve chest associated therewith at each end thereof, reciprocating exhaust valves in said chests having their axes in one horizontal plane, reciprocating admission valves in said chests having their axes in a superimposed horizontal plane, said chests being so disposed as to provide a clear space between them extending vertically from one of said planes to the other, cam mechanism positioned intermediate said chests including admission cam means and exhaust cam means in superimposed relation operatively associated respectively with the valves in said two planes, and a common casing for both cam means removably mounted between said chests and occupying said clear space.

5. In a locomotive engine or the like, a cylinder, for each end of the cylinder a plurality of steam admission valves and a plurality of exhaust valves, a single cam shaft operatively associated with and adapted to actuate all the admission valves of said cylinder, another cam shaft operatively associated with and adapted to actuate all of the exhaust valves of said cylinder, and separately operatable actuating connections to the two cam shafts.

6. In a locomotive engine or the like, a cylinder with a valve chest at each end thereof, in each chest a fluid passage communicating with the cylinder, a pair of exhaust valves communicating with said passage having their axes in spaced parallelism and lying relatively close to the cylinder wall, and admission valve means located intermediate two parallel planes which respectively contain the exhaust valve axes.

7. In a locomotive engine or the like, a cylinder with a valve chest at each end thereof, in each chest a fluid passage communicating with the cylinder, a pair of exhaust valves communicating with said passage having their axes in spaced parallelism and lying relatively close to the cylinder wall, and admission valve means located intermediate two parallel planes which respectively contain the exhaust valve axes and in spaced relation to a plane common to the two exhaust valve axes.

8. In a locomotive engine or the like, a cylinder with associated valve chests, one at each end, a plurality of reciprocating admission valves in each chest, a plurality of reciprocating exhaust valves in each chest, cam mechanism positioned intermediate said chests including admission cam means and exhaust cam means operatively associated respectively with the admission valves and the exhaust valves at both ends of the cylinder, separately operatable actuating connections to the two cam means, and the cam mechanism for all valves being supported as a unit for unitary removal from between the chests.

9. In a locomotive engine or the like, a cylinder with associated valve chests, one at each end, in each chest a plurality of reciprocating admission valves having their axes in one plane, in each chest a plurality of reciprocating exhaust valves having their axes in another plane which is closer to the cylinder than is said first plane, and cam mechanism positioned intermediate said chests including admission cam means and exhaust cam means operatively associated respectively with the valves in said two planes but all unitarily housed for common removal and replacement.

10. In a locomotive engine or the like, a saddle structure having a cylinder at the side thereof, a valve chest at each end of the cylinder and extending upwardly therefrom, with a space between said chests, valves in said chests having stems projecting into said space, and valve actuating mechanism located in said space above the cylinder, between said chests, and having members engaging said stems in abutting relation, driving connections to said mechanism at the inner side thereof adjacent the saddle, and means mounting said mechanism for ready removal laterally outwardly upon uncoupling of said connections, without disturbing said members and stems.

11. In a locomotive engine or the like, a saddle structure having a cylinder integral therewith at the side thereof, a valve chest at each end of the cylinder and extending upwardly therefrom with a space between said chests, valves in said chests having operating means projecting into said space, valve actuating mechanism located in said space above the cylinder, between said chests, and associated with said operating means, movable driving connections coupled to said mechanism at the inner side thereof, and passage means formed in said saddle structure in position to provide clearance for assembly and operation of said movable driving connections.

12. In a locomotive engine or the like having a pair of cylinders whose longitudinal axes lie in substantially separated parallel vertical planes and adapted to carry a valve gear mechanism between said planes, at each end of each of said cylinders a valve chest extending generally radially therefrom in a manner to leave a clear space between the chests of each pair, admission and exhaust valve means in each chest of each cylinder, a cam box unit associated with each cylinder in a position between the chests thereof and having transversely extending shafting with cam means thereon for actuating the valves in both chests, disconnectible actuating means extending from said valve gear to said shafting for each cylinder, and means removably mounting each cam box unit for ready removal outwardly from between said chests upon disconnection of said actuating means.

13. In a locomotive engine or the like having a pair of cylinders whose longitudinal axes lie in substantially separated parallel vertical planes and adapted to carry a valve gear mechanism between said planes, at each end of each of said cylinders a valve chest extending generally radially therefrom in a manner to leave a clear space between the chests of each pair, exhaust valves and admission valve means in generally superimposed planes in each chest, cam mechanism for each cylinder positioned intermediate said chests including admission cam means and exhaust cam means operatively associated respectively with the valves in said two planes, separate shafts for actuating the admission and exhaust cams, and independent driving connections from the valve gear to the inner ends of the admission and exhaust cam shafts.

14. In a locomotive engine or the like, a cylinder having valve-controlled portage at each end thereof, and at each of said ends a divided fluid pressure conduit, the branches of which communicate with its respective portage at spaced apart points peripherally of the cylinder.

15. In a locomotive engine or the like, a cylinder, portage adjacent an end of the cylinder, a plurality of valves actuated substantially in unison for parallel control of said portage, and separate passages communicating with each of said valves.

16. In a locomotive engine or the like, a cylinder, portage adjacent an end of the cylinder, a plurality of exhaust valves actuated substantially in unison for controlling the exhaust of steam from said portage, separate exhaust passages communicating with each of said valves, and admission valve means located between the general vertical planes of said passages.

17. In a locomotive engine or the like, a cylinder having portage at each end thereof, for each end a plurality of valves actuated in unison for controlling said portage, and at each end a divided fluid pressure conduit, the branches of which communicate respectively with the individual valves at spaced apart points peripherally of the cylinder, said branches being at least in part in superimposed relation with clearance therebetween for the passage of valve gear mechanism.

18. In a locomotive engine or the like, a cylinder having portage at each end thereof, for each end a plurality of valves actuated in unison for controlling said portage, and at each end a divided fluid pressure conduit, the branches of which communicate respectively with the individual valves at spaced apart points peripherally of the cylinder, the merged ends of said divided conduits for the two ends of the cylinder being connected to a common fluid passage.

19. In a locomotive engine or the like, a cylinder having portage at each end thereof, for each end a plurality of valves actuated in unison for controlling said portage, and at each end a divided fluid pressure conduit, the branches of which communicate respectively with the individual valves at spaced apart points peripherally of the cylinder, and a valve-actuating unit mounted on the cylinder between said branched conduits.

20. In a locomotive engine or the like, a cylinder, a valve chest at each end thereof, divided exhaust conduit means extending generally peripherally from each chest and communicating therewith at spaced-apart zones, and steam admission conduit means delivering adjacent the front of the forward chest and adjacent the back of the rear chest, at regions intermediate said zones.

21. In a locomotive engine or the like, a cylinder, a valve chest at each end thereof, branched exhaust conduit means extending generally peripherally or tangentially from each chest, steam admission conduit means delivering adjacent the front of the forward chest and adjacent the back of the rear chest, valve actuating mechanism located above the cylinder intermediate the two chests, and associated steam admission valve actuating members extending forwardly and rearwardly into said chests between the branches of the exhaust conduits.

22. A locomotive engine casting comprising at least a cylinder, a valve chest at each end thereof, a support for valve operating mechanism intermediate said chests, and a saddle portion with generally transverse upright wall structure configured to provide passage means for longitudinally-extending linkage adapted for coupling to such mechanism when mounted on said support, all integrally formed as a unit.

23. A locomotive engine casting comprising at least a cylinder, a valve chest at each end thereof, a support for valve operating mechanism intermediate said chests, a saddle portion with generally transverse upright wall structure configured to provide passage means for longitudinally-extending linkage adapted for coupling to such mechanism when mounted on said support, and steam conduit means associated with said chests and lying generally transversely with relation to the cylinder axis and in vertically spaced relation to said passage means, all integrally formed as a unit.

24. A cylinder and saddle casting having an integral valve chest at each end and a divided exhaust conduit for each chest extending laterally inwardly into the saddle, both of said divided conduits merging into a common outlet.

25. A cylinder and saddle casting having an integral valve chest at each end and a divided exhaust conduit for each chest extending laterally inwardly into the saddle, each such conduit having its branches communicating with the respective chest at zones spaced peripherally of the cylinder.

26. A locomotive engine casting embodying a saddle structure having generally upright transverse and longitudinal webs, a cylinder alongside the saddle with a valve chest at each end of the cylinder, generally horizontal webbing interbracing the valve chests and the webs of the saddle structure, and forked steam conduits, one for each chest, each having upper and lower branches connected to the respective chest at points spaced apart peripherally thereof, said forked conduits converging toward the center of the saddle structure from said valve chests and extending upwardly through said webbing, all formed as an integral unit.

27. In a locomotive engine or the like, having a cylinder with removable cylinder head, at an end of said cylinder a valve chest structure comprising a port communicating with the cylinder and defined chiefly by two closely-spaced walls in substantially continuous parallel planes perpendicular to the cylinder axis, steam and exhaust passages opening into said port at points one above another, a steam admission valve positioned to control the opening of one of said passages, an exhaust valve positioned to control the opening of the other of said passages, external access means at the outer end of the chest through which said valves are withdrawable endwise comprising substantially contiguous superimposed openings, closed by cover means, with their peripheries as close to each other as permitted by a relatively thin intervening partition wall, the access means as a group being substantially as close to the cylinder wall as permitted by said cylinder head, and said valves being located on centers aligned with said access openings, by which arrangement the volume of said port is reduced approximately to the minimum in proportion to the effective steam flow area thereof.

28. In a locomotive engine or the like, having a cylinder, at an end of said cylinder a valve chest structure comprising a port communicating with the cylinder and defined chiefly by two closely-spaced walls in substantially continuous parallel planes perpendicular to the cylinder axis, steam and exhaust passages opening into said port at points one above another, a steam admission valve positioned to control the opening of one of said passages, an exhaust valve positioned to control the opening of the other of said passages, a removable cylinder head, and removable end closure means for said chest by which said valves are withdrawable endwise, said head and closure means being in substantially peripherally abutting relation, and the openings into said parallel-walled port and the valves controlling the same being located on centers as close to each other and to the cylinder axis as permitted by said removable head and closure means, by which arrangement the volume of said port is reduced approximately to the minimum in proportion to the effective steam flow area thereof.

29. A construction according to the preceding claim wherein the steam and exhaust passages each have a pair of openings into said port, the pair of exhaust openings being adjacent the top of the cylinder and the pair of steam passage openings being positioned thereabove and on closer centers than the exhaust passage openings, the valves being of the annular poppet type arranged in pairs to correspond with said openings, the admission valves being of smaller diameter than the exhaust valves.

30. In a locomotive engine or the like, having a cylinder, at an end of said cylinder a valve chest structure comprising a port communicating with the cylinder and defined chiefly by two closely-spaced walls in substantially continuous parallel planes perpendicular to the cylinder axis, steam and exhaust passages opening into said port at superimposed zones, steam admission valve means positioned to control the uppermost opening, exhaust valve means positioned to control the lowermost opening, a removable cylinder head, and removable end closure means for said chest by which said valve means are withdrawable endwise, said head and closure means being in substantially peripherally abutting relation, and the openings into said parallel-walled port and the valve means controlling the same being located on centers as close to each other and to the cylinder axis as permitted by said removable head and closure means, said valve means further being of the annular poppet type, with the admission valve means lying largely in said port when seated and the exhaust valve means lying largely outside of the direct path of steam flow through said port when seated, by all of which arrangement the volume of said port is reduced approximately to the minimum in proportion to the effective steam flow area thereof.

WILLIAM E. WOODARD.

CERTIFICATE OF CORRECTION.

Patent No. 2,255,303. September 9, 1941.

WILLIAM E. WOODARD.

It is hereby certified that error appears in the printed specification of the above numbered patent requiring correction as follows: Page 2, first column, line 65, for "8p" read --18p--; page 4, first column, line 57, claim 1, strike out "and" and insert the same before "in", line 56, same claim, page 6, second column, line 65, claim 30, for "ffow" read --flow--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.